United States Patent [19]
Ventre

[11] 3,731,999
[45] May 8, 1973

[54] FILMSTRIP VIEWER ATTACHMENT FOR TAPE RECORDER

[76] Inventor: Daniel B. Ventre, 24 Anderson Street, Stamford, Conn. 06902

[22] Filed: Mar. 4, 1971

[21] Appl. No.: 121,030

[52] U.S. Cl. .................................................353/18
[51] Int. Cl. ..............................................F03b 31/06
[58] Field of Search.....................353/120, 117, 16, 353/15, 17, 18; 40/28.1, 28.2; 352/31, 32, 33; 274/4 C

[56] References Cited

UNITED STATES PATENTS

| 2,551,349 | 5/1951 | Supitilov | 353/16 |
| 3,288,028 | 11/1966 | Sours | 353/16 |

FOREIGN PATENTS OR APPLICATIONS

| 13,944 | 9/1962 | Japan | 352/33 |

Primary Examiner—Harry N. Haroian
Attorney—Blair, St. Onge, Mayers & Cahill

[57] ABSTRACT

A filmstrip viewer which is removably mounted to and driven by a tape recorder, particularly of the cassette type, to provide a system for presenting synchronized pictures and sound. A drive shaft in the viewer is removably connectable to and driven in synchronism with the spool of a tape cassette, cartridge or reel loaded on the tape recorder. The drive shaft is geared to sprocket wheels which advance the filmstrip through the viewer, and the gearing provides for frame-by-frame advancement with an appropriate time delay for the incorporation of the sound presentation. The viewer may also be provided with an improved lamp socket, an automatic illumination switch, and with manual means for advancing and adjusting the filmstrip position.

13 Claims, 11 Drawing Figures

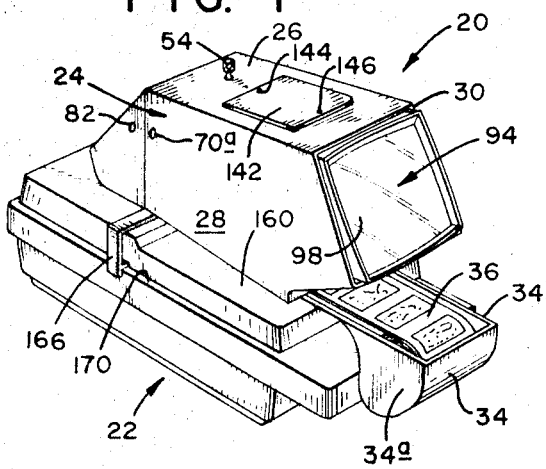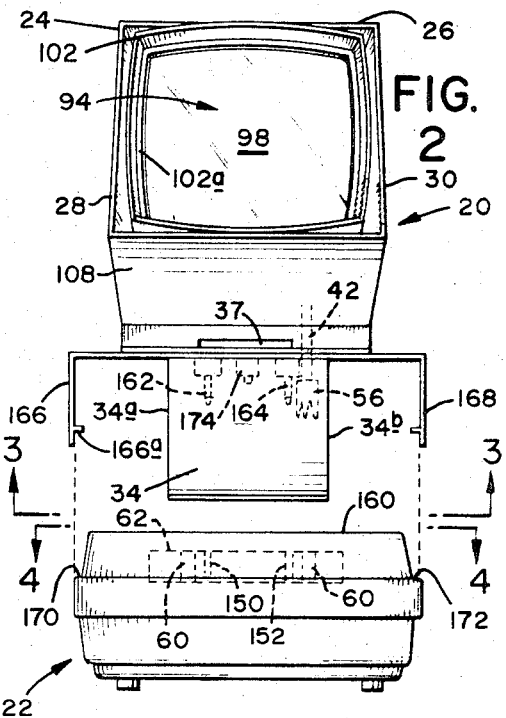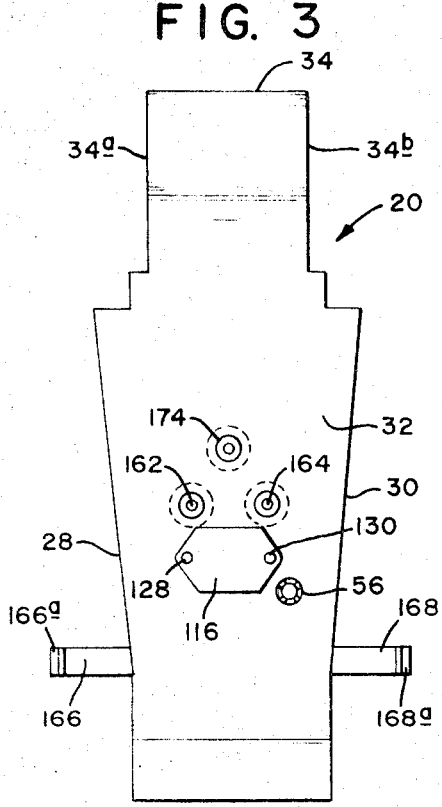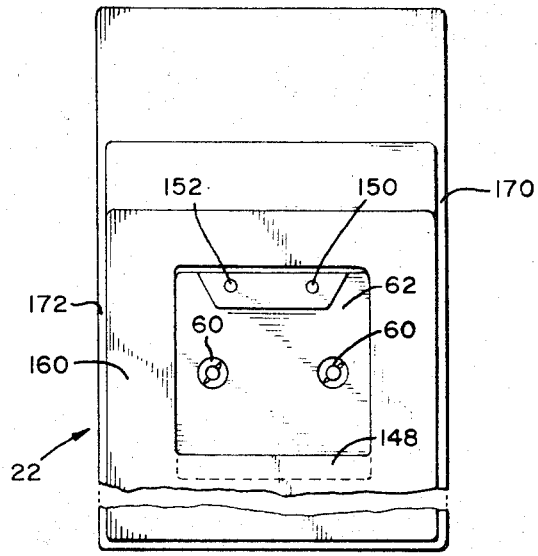

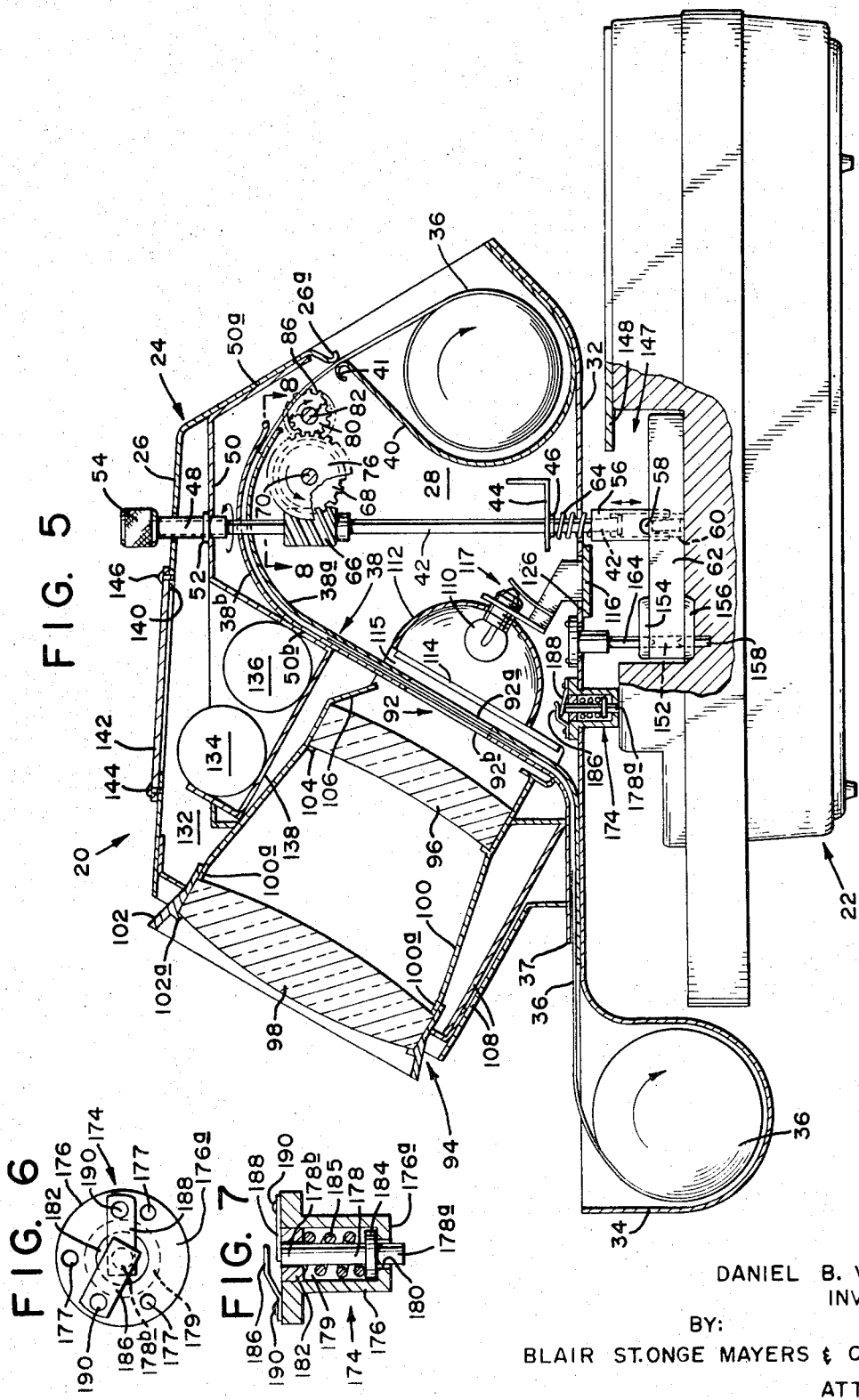

DANIEL B. VENTRE
INVENTOR.

BY
BLAIR ST.ONGE MAYERS & CAHILL
ATTORNEYS.

FILMSTRIP VIEWER ATTACHMENT FOR TAPE RECORDER

BACKGROUND OF THE INVENTION

The use of filmstrip materials as a lecture, marketing or teaching medium has achieved wide popularity. It is often desirable, however, to incorporate the added dimension of sound to such materials to increase the information content in an interesting manner. One convenient way of providing sound accompaniment for a filmstrip is to have a separate magnetic tape recording synchronized to the sequence of views on the strip. Problems arise however in producing such synchronized tapes and in insuring that the filmstrip and tape recording remain properly synchronized during viewing.

A convenient and relatively inexpensive device for recording and playing back magnetic tapes is the recently developed cassette type tape recorder. These instruments are easy to use, compact, and generally portable. For these reasons cassette tape recorders are well suited and desirable for use with filmstrip viewing systems, although so far as I am aware no such use therefore has heretofore been made.

Accordingly representative objects of the present invention are to provide a filmstrip viewer adapted for use with a tape recorder, preferably of the cassette type, to provide a system for presenting synchronized pictures and sound, said viewer being of relatively simple construction, easy to use and maintain, economical, and reliable.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

SUMMARY OF THE INVENTION

The present invention relates to a filmstrip viewing system which facilitates the incorporation of synchronized sound, and more particularly to a filmstrip viewer constructed to be mounted on and operated in synchronism with a tape recorder of preferably the cassette type.

The viewer comprises an enclosed structure through which the filmstrip is fed. A viewing station comprising a magnifying lens system is provided on the viewer, through which the operator can view each frame of the filmstrip as it is sequentially fed past.

The motive power for feeding the filmstrip is provided by the cassette tape recorder to which the viewer is mounted. When mounted together, a drive shaft from the viewer engages with and is driven by one of the spools on a tape cassette previously loaded into the recorder. The drive shaft drives a pair of sprocket wheels through an appropriately geared down gear train, and the sprocket wheels in turn engage the sprocket holes in the filmstrip to transport the filmstrip through the viewer in synchronism with the playing of the cassette. A pair of gears in the gear train are constructed to disengage for a predetermined interval of time in each cycle. This causes the filmstrip to stop at each frame to permit viewing accompanied by an appropriate sound presentation.

Since the filmstrip and the recording tape always move in synchronism through the viewer-tape recorder system, the system may be used for the production of synchronized tapes as well as for giving a synchronized presentation once the tapes are made. The system thus serves as a convenient means for both making and presenting audio-visual displays for lectures, teaching, marketing or the like.

The source of illumination in the viewer is preferably battery operated so that the viewer is completely portable and thus wholly compatible with the typical cassette tape recorder which is also portable and battery operated. In addition, the viewer can be operated without modification of the tape recorder so that the recorder can be readily used alone once the viewer is removed.

BRIEF DESCRIPTION OF THE DRAWINGS

For a fuller understanding of the nature and objects of the invention, reference should be had to the following detailed description taken in connection with the accompanying drawings, in which:

FIG. 1 is a side perspective view of the filmstrip viewer of the invention shown mounted on a typical cassette type tape recorder.

FIG. 2 is an exploded front elevation view of the filmstrip viewer and cassette tape recorder shown in FIG. 1.

FIG. 3 is a bottom plan view of the filmstrip viewer taken along line 3—3 of FIG. 2.

FIG. 4 is a broken top plan view of the cassette tape recorder taken along line 4—4 of FIG. 2 and showing a tape cassette loaded thereon.

FIG. 5 is a side elevation view in section of the filmstrip viewer mounted on a cassette tape recorder and showing the internal construction of the viewer and the means for synchronously driving the viewer and recorder.

FIGS. 6 and 7 are respectively top plan and sectional side elevation views of an automatic on-off switch for the filmstrip viewer.

Similar reference characters refer to similar parts throughout the several views of the drawings.

DESCRIPTION OF THE PREFERRED EMBODIMENTS

Figure 8:
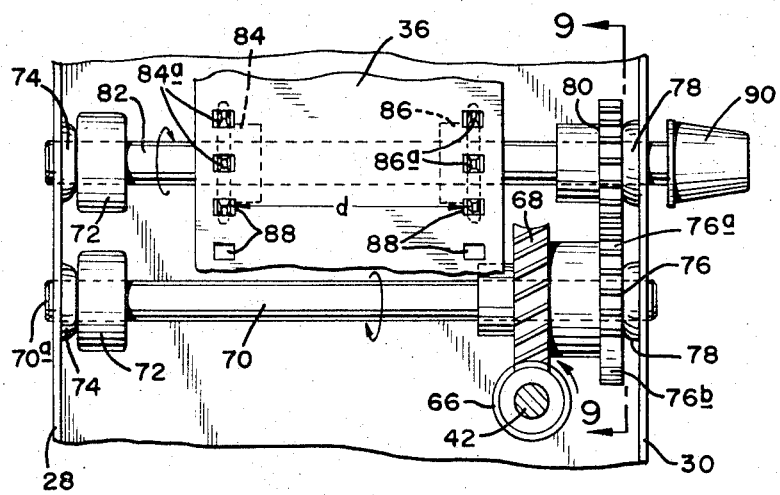
FIG. 8 is a partial top plan view in section taken along line 8—8 of FIG. 5.

Referring now to FIG. 1, the filmstrip viewer of the invention, shown generally at 20, is constructed as a modular attachment to be removably mounted on and driven in synchronism with preferably a standard tape cassette recorder such as that shown generally at 22, although viewer 20 may also be readily adapted to use with a conventional double reel-type or cartridge loaded recorder. The combination of viewer 20 and recorder 22 thus forms a readily portable system which can be dismantled to facilitate its transport from place to place, and in which tape recorder 22 can still be used alone whenever desired.

Viewer 20 comprises a housing 24 which is preferably formed of either sheet metal or plastic. The housing illustrated in the drawings is a sheet metal version, but it will be understood that a plastic version, although generally similar in shape and structure to that shown, will necessarily differ in some respects dictated by the design characteristics of plastic materials. The sheet metal housing 24 comprises a top plate 26, two side plates 28 and 30 and a bottom plate 32 (FIG. 5). The aforementioned plates may either be formed separately and joined by corner seams, or two or more may be integral and bent from a single metal sheet.

Bottom plate 32 includes a forwardly extended portion shaped in an arcuate configuration to form a supply drum 34 for a roll of filmstrip 36 (FIGS. 1 and 5). Supply drum 34 is also provided with sidewalls 34a and 34b to properly confine filmstrip 36. From supply drum 34 filmstrip 36 is fed through a chute 37 into a film track 38 defined at the interior of housing 24 by a slightly spaced pair of generally S-shaped plates 38a and 38b (FIG. 5). Filmstrip 36, after having passed through viewer 20, is rolled up and collected at the back in a take-up drum 40. Drum 40 is formed of an arcuately shaped plate secured to the interior surface of bottom plate 32 as shown in FIG. 5. The interior edge 41 of drum 40 is preferably curled over and coacts with the adjacent, similarly curled edge 26a of top plate 26 to form a guideway for the entrance of filmstrip 36 into take-up drum 40.

Referring now to FIGS. 5 and 8, the mechanism for driving filmstrip 36 through viewer 20 in synchronism with the operation of tape recorder 22 includes a drive shaft 42 which projects at its lower end through bottom plate 32 and at its upper end through top plate 26 of housing 24. Drive shaft 42 is preferably journalled for support adjacent its lower end in an L-shaped support bracket 44 which is secured between side plates 28 and 30 of housing 24. Shaft 42 is also provided with a collar 46 which engages below bracket 44 to limit the upward movement of shaft 42. At its upper end, shaft 42 is secured within a sleeve 48 which in turn is journalled in a support plate 50. Support plate 50 is secured at one end 50a to top plate 26 and at the other end 50b to plate 38b. Sleeve 48 carries a collar 52 which engages the upper surface of support plate 50 to limit the downward movement of shaft 42. Accordingly, collars 46 and 52 act to fix shaft 42 axially within housing 24. The upper end of sleeve 48 projects through top plate 26 and is capped by a manual feed knob 54, the function of which is more fully described hereinafter.

At its protruding lower end, shaft 42 carries an axially mounted sprocket hub 56 which is slotted on the bottom 58 so it can extend into and engage the spool 60 of a tape supply such as a cassette 62 previously loaded into tape recorder 22. It will be understood, however, that when viewer 20 is used with a double reel-type or cartridge loaded tape recorder sprocket hub 56 similarly engages the center spool of one reel or the cartridge. Thus when viewer 20 and recorder 22 are joined as shown in FIG. 5, spool 60 as it is driven by tape recorder 22 in turn drives shaft 42 in synchronism to provide the motivating force for the operation of viewer 20. Sprocket hub 56 is preferably slidable on shaft 42 as shown and a coil spring 64 is provided on the shaft between hub 56 and collar 46. Spring 64 thus acts as a shock absorber and allows hub 56 to automatically adjust to minor variations in the depth of a given spool 60.

The motive power from shaft 42 is transmitted to filmstrip 36 by means of a gear train and sprocket wheel assembly as shown in FIGS. 5 and 8. A worm gear 66 is secured to shaft 42 at an intermediate position between bracket 44 and plate 50 (FIG. 5). Worm gear 66 in turn meshes with a worm wheel 68 which is secured to a first shaft 70 journalled between side plates 28 and 30 (FIG. 8). Shaft 70 is secured against lateral movement by a collar 72 mounted thereon at one end and abutting a nipple 74 on the interior surface of plate 28, and by a driving gear 76 mounted on the other end and abutting a corresponding nipple 78 at the interior surface of side plate 30. Thus, as worm gear 66 is driven counterclockwise it in turn drives worm wheel 68 in the direction shown in FIG. 8. Worm wheel 68 thus causes shaft 70 and its attached driving gear 76 to rotate in a counterclockwise direction as seen in FIG. 5. Driving gear 76 in turn meshes with a driven gear 80 secured to a secured shaft 82 which is parallel to shaft 70 and similarly journalled between side plates 28 and 30.

As shown in FIG. 8, shaft 82 carries a pair of spaced sprocket wheels 84 and 86. Wheels 84 and 86 are spaced apart at their respective sprockets 84a and 86a a distance d corresponding to the spacing between the two rows of sprocket holes 88 in the edges of filmstrip 36. Thus, as driven gear 80 is rotated in a clockwise direction by driving gear 76 as shown in FIG. 5, it causes shaft 82 and the attached sprocket wheels 84 and 86 to similarly rotate in a clockwise direction. Wheels 84 and 86 thus serve as the ultimate means for advancing filmstrip 36 through viewer 20 in synchronism with the playing of tape cassette 62.

Figure 9:
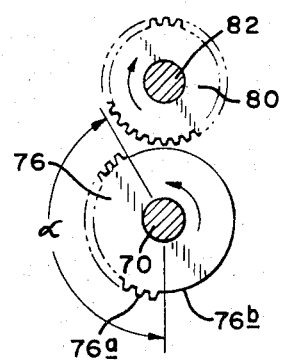
FIG. 9 is a side elevation view of a portion of the gear train used in the viewer.

For proper viewing of filmstrip 36 it is necessary that the filmstrip stop for a predetermined period of time at each frame. The stop is also correlated with the playback of descriptive or background sound relating to that frame and emanating from recorder 22. For this purpose, driving gear 76 is provided with teeth 76a over only a portion of its periphery as shown in FIG. 9. The angular extent α of teeth 76a on gear 76 will depend upon the length of the frames on filmstrip 36, the gear ratio between gears in the gear train, and the amount of time one desires to delay movement of filmstrip 36 in order to incorporate the sound presentation. As shown in FIG. 9, the interval during which filmstrip 36 is delayed begins when blank portion 76b comes tangent to gear 80. At that point the two gears become disengaged and sprocket wheels 84 and 86 stop until teeth 76a again rotate into engagement with gear 80.

The length of a frame on a typical filmstrip is 0.75 inch. With such a filmstrip the gear train shown in FIG. 8 may, as an example, be constructed to provide a 1:8.5 speed ratio between the tape recorder drive and the sprocket wheels; accordingly, if the tape recorder is driven at a typical 34 RPM the sprocket wheels will be driven at 4 RPM. An exemplary driving gear 76 in such a gear train may have a pitch diameter of 0.750 inch, a pitch of 48, and have 12 teeth extending over an angle α of 120°. Concurrently, driven gear 80 may have a pitch diameter of 0.500 inch, a pitch of 48 and have 24 teeth. Worm wheel 68 in such a train may have a pitch diameter of 0.625 inch, a pitch of 48 and have 30 teeth while worm gear 66 may be a right handed, four thread, 48 pitch gear having a pitch diameter of 0.333 inch. Each frame of a typical filmstrip driven by such a gear train will delay for an interval of approximately 10 seconds to permit viewing with appropriate sound. Other delay times may be achieved as desired by changing the gear ratios in the gear train.

Shaft 82 may also be provided with an adjustment knob 90 as shown in FIG. 8. Knob 90 permits the operator to finely adjust the position of the filmstrip within the viewer in a manner more fully described hereinafter.

Referring back to FIG. 5, as filmstrip 36 moves in a frame-by-frame sequence through track 38, each frame thereof is stopped within an aperture 92. Aperture 92 is formed by a pair of aligned openings 92a and 92b respectively formed in plates 38a and 38b and shaped to correspond substantially identically with the shape of each frame. As can be seen in FIG. 5, aperture 92 is positioned at an intermediate point in the viewing station 94 of viewer 20.

Viewing station 94 comprises a lens assembly through which each frame on filmstrip 36 may be viewed, preferably with some degree of magnification, and also a source of illumination to make each said frame clearly visible to the viewer. Specifically, as shown in FIG. 5, a typical lens system comprises a corrector lens 96 and a magnifying viewing lens 98 mounted over aperture 92 in spaced relation to one another in a lens bracket 100. Bracket 100 also preferably includes a viewing lens shield 102 secured to the forward edges 100a thereof and surrounding viewing lens 98 to help prevent glare. Lens 96 is held in position within bracket 100 between a bead 104 which projects from the inner surface of bracket 100 and an inwardly bent tab 106. Viewing lens 98 is held in position between forward edges 100a of bracket 100 and an inwardly directed flange 102a on shield 102. Lenses 96 and 98 may also be cemented in place for increased stability.

The entire lens assembly as secured within bracket 100 is then incorporated into the front end of housing 24 where it is substantially surrounded by the forward ends of top plate 26 and side plates 28 and 30 (FIG. 5). A lens housing plate assembly 108 is secured under bracket 100 to side plates 28 and 30 and bottom plate 32. Assembly 108 helps to support the lens assembly, completes the enclosure of the lens assembly, and serves to aesthetically complete housing 24.

The illumination for filmstrip 36 is provided by an electric lamp 110 mounted behind aperture 92 as shown in FIG. 5. Lamp 110 is surrounded by a reflector 112 mounted to the lamp base 113. Reflector 112 directs light toward aperture 92 through a diffuser 114 mounted to a bracket 115 on plate 38a. Diffuser 114 may be formed of ground glass or the like. While lamp 110 may be mounted in a conventional socket, it is preferably mounted in the special socket 117 shown in detail in FIGS. 10 and 11. Socket 117 comprises an insulated pedestal 115 formed of any common electrical insulating material such as a phenolic resin. Pedestal 115 is in turn secured to a base plate 116. The free end of pedestal 115 carries a mounting plate 118 formed of electrically conductive material such as spring brass.

Figure 11:
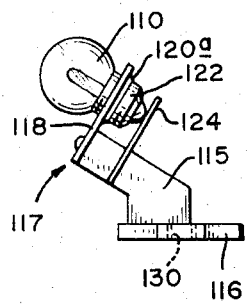

Plate 118 is provided with a central lamp aperture 120 having a diameter substantially equal to the diameter of lamp base 113 and having an edge 120a which is cupped inwardly as shown in FIG. 11. The inwardly cupped edge 120a of aperture 120 thus acts as a single screw thread through which lamp base 113 can be either threadedly or frictionally secured.

Figure 10:
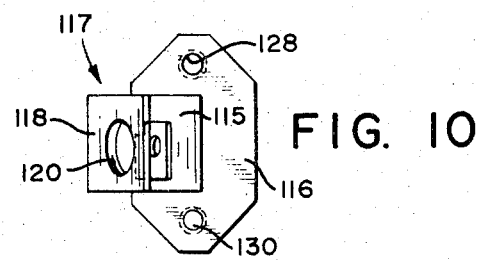
FIGS. 10 and 11 are respectively top plan and side elevation views of a preferred form of lamp socket for use in the filmstrip viewer.

A base contact plate 124 is also provided on pedestal 114, spaced slightly from plate 118 and parallel thereto. Plate 124 is also formed of a conductive material such as spring brass and serves to complete the electrical contact with lamp base 113 when lamp 110 is in position as shown in FIG. 11. The special socket 117 shown in FIGS. 10 and 11 is most advantageously used in the viewer of the invention because it occupies less space than a conventional lamp socket.

As shown in Fig. 5, lamp socket 117 is inserted into position within viewer 20 through a lamp socket opening 126 in base plate 32. Socket 117 may then be held in position by screws or the like which pass through screw holes 128 and 130 (FIG. 10) in plate 116 and into threaded engagement with base plate 32. Plate 116 thus serves to close opening 126 as shown in FIGS. 3 and 5.

Although the power for lamp 110 may be supplied from house current, viewer 20 is preferably battery powered so as to be completely portable. For this purpose a battery compartment 132 is provided below top plate 26 as shown in FIG. 5. The batteries 134 and 136, which are typically a pair of C-cells, are supported on a battery shelf 138 which is merely an extended portion of support plate 50. Appropriate electrical connections (not shown) are then made between batteries 134, 136 and lamp 110. The nature of such electrical connections may take a variety of forms which will be apparent to those skilled in the art. Access to battery compartment 132 is gained through a battery compartment opening 140 (FIG. 5) which is provided in top plate 26 directly over batteries 134 and 136. Opening 140 is conveniently closed during operation of viewer 20 by a battery compartment cover 142 held in place by small screws 144 and 146 threaded into top plate 26 as shown. Alternatively, cover 142 may be hinged or frictionally secured over opening 140.

Before mounting viewer attachment 20 to recorder 22, shaft 42 is rotated via knob 54 to an angular orientation such that driving gear 76 is disengaged from driven gear 80, as shown in FIG. 9. This procedure should be carried out in every instance before the viewer is loaded so as to permit framing of the filmstrip. To facilitate the orientation of gear 76 such that its blank portion 76b is tangent to driven gear 80, it is preferable to provide a reference mark on the end 70a of shaft 70 (FIGS. 1 and 8) which, when aligned with a reference mark on plate 28, insures that gears 76 and 80 are disengaged. A filmstrip 36 is then placed in supply drum 34 and its leader manually fed into chute 37 and through track 38 into engaging relation with sprockets 84 and 86. The operator then manually rotates feed knob 90 on sprocket shaft 82 to further advance the filmstrip and align the first frame of the filmstrip in viewing station 94. As will be appreciated from the description to follow, the operator may depress a switch button 178a to turn on viewer lamp 110 and thus facilitate precise alignment of the first filmstrip frame in viewing station 94. Alternatively, the operator may defer precise framing until the viewer and recorder are mated and before the recorder is turned on. When the recorder is turned on, drive gear 76 is rotated to index the filmstrip frame by frame, as previously described.

Referring now to FIGS. 4 and 5, in the preferred embodiment a tape cassette 62 is next loaded into a chamber 147 provided therefor in recorder 22. Cassette 62 is inserted under lip 148 and pressed down to engage the cassette spools 60 with the corresponding drive members on the recorder. To facilitate the insertion of cassette 62 in proper alignment, the cassette is normally provided with a pair of locating holes 150 and 152 (FIG. 4). Holes 150 and 152 typically extend completely through cassette 62 and open on lands 154, 156 (FIG. 5) on either side thereof. The locating holes are provided on both sides since such cassettes are designed to be flipped over to maximize the usable number of tape bands. Locating holes 150 and 152 are positioned so that they telescopically receive a corresponding pair of locating pins 158 (FIG. 5) projecting from the bottom of chamber 147 of the recorder when the cassette is loaded. This insures correct cassette alignment.

Once respectively loaded with a filmstrip and a cassette, viewer 20 and recorder 22 are then ready to be mounted together. The viewer is lowered onto the top surface 160 of the recorder so that a pair of locating fingers 162, 164 (FIGS. 2 and 3) mounted to bottom plate 32 (FIG. 5) are respectively aligned with the open upper portions of locating holes 150 and 152. This serves to align sprocket hub 56 over the mating spool 60 (right hand spool as seen in FIG. 4) on cassette 62. As viewer 20 is lowered, locating fingers 162 and 164 enter locating holes 150 and 152 and position the viewer and recorder so that sprocket hub 56 properly enters and engages the appropriate spool 60 (FIG. 5).

Viewer housing 24 is also provided with a pair of L-shaped legs 166 and 168 which project laterally from side plates 28 and 30 as shown in FIG. 2. As viewer 20 comes to rest on recorder 22, inwardly projecting flanges 166a and 168a on support legs 166 and 168 come to rest on the edges 170 and 172 of the recorder. Legs 166 and 168 thus serve to partially support the weight of the viewer and take the strain off sprocket hub 56. A third support leg 174 projects from bottom plate 32 at a point spaced from and centered between legs 166 and 168 as shown in FIGS. 3 and 5. Support legs 166, 168 and 174 thus provide a very stable, three-point support structure fro the viewer.

Preferably, support leg 174 also incorporates an automatically actuated on-off switch for lamp 110 as shown in FIGS. 5-7. For this purpose, leg 174 comprises a hollow hub 176 (FIG. 7) which is securely affixed to bottom plate 132 by screws 177, rivets, or the like (FIGS. 5 and 6). A reciprocable shaft 178 is provided in the hub bore 179 with one end thereof projecting from an opening 180 in the hub bottom 176a to form a switch button 178a. The other end 178b of shaft 178 is loosely journalled in a bearing member 182 which closes off bore 179. A collar 184 on shaft 178 within bore 179 and adjacent opening 180 holds the shaft within hub 176. Switch button 178a is biased through opening 180 by a coil spring 185 mounted over shaft 178 between bearing 182 and collar 184. The switch is completed by a pair of electrically conductive contact members 186 and 188 secured to the top of hub 176 by rivets 190, screws, or the like. Contact members 186 and 188 may be formed of spring brass or a similar material. As seen in FIG. 7, contact member 188 normally lies flat atop hub 176 and extends over end 178b of shaft 178. Contact member 186 is bent to overlap contact member 188 while being spaced therefrom; this is the "off" position of the switch.

Referring now to FIGS. 5 and 7, it can be seen that when viewer 20 is mounted on recorder 22, switch button 178a is driven upward against the bias of spring 186 by the weight of the viewer. This in turn causes shaft 178b to move upward within bore 179 whereby shaft end 178b lifts contact member 188 until it makes electrical contact with contact member 186 as shown in FIG. 5; this "on" position of the switch causes lamp 110 to be energized by batteries 134 and 136 and illuminates filmstrip 36 for viewing. Although the support leg - mounted, automatic on-off switch just described is preferred, it will be understood that a separate, operator actuated switch may be used in its place if desired.

Once illumination is present, the operator may visually check and finally adjust the position of the filmstrip so that the first frame thereof is exactly centered in the viewing station. The final adjustment is made with adjustment knob 90 (FIG. 8). Knob 90 may be freely moved even though the viewer and recorder are joined since driven gear 80 and driving gear 76 are always disengaged at the beginning of a cycle (FIG. 9). By moving knob 90 the operator in turn moves sprocket wheels 84 and 86 and may thus wind filmstrip either forward or backward until the first frame is centered. Once centered the operator then actuates recorder 22 to set the entire system in operation.

Although the viewer of the invention has been shown in a specific embodiment as having a particular shape to adapt it for use with a specific cassette recorder configuration, it will be understood that the viewer shape may be varied to fit other recorder configurations without departing from the scope of the invention. Also a number of the internal parts of viewer 20 have been described as being secured or journalled to side plates 28 and 30 of housing 24. Alternatively, a separate chassis (not shown) may be provided within housing 24 to which these same internal parts may be secured or journalled. Such a separate chassis facilitates the advantageous removal of housing 24 to permit ready access to the internal workings of the viewer.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Having described my invention, what I claim as new and desire to secure by Letters Patent is:

1. A filmstrip viewer adapted for removable mounting to a tape recorder and being driven from a spool of a tape supply member loaded on the tape recorder to provide synchronized audiovisual presentations, comprising, in combination:
   A. an enclosure including means for guiding a filmstrip therethrough over a predetermined path,
   B. support means for removably supporting said enclosure on the tape recorder,
   C. viewing means in said enclosure permitting the viewing of the filmstrip as it passes through said viewer,
   D. advancing means for moving the filmstrip in a frame-by-frame sequence through said viewer, and
   E. driving means removably connectable to said spool and geared to said advancing means to actuate said advancing means in synchronism with the motion of said spool.

2. A filmstrip viewer as defined in claim 1 wherein said advancing means comprises a pair of sprocket wheels journalled adjacent said path in position to engage the sprocket holes on the filmstrip, said driving means comprising a drive shaft protruding at one end from said enclosure and carrying at said one end a fitting removably connectable with said spool, the other end of said drive shaft being geared to said sprocket wheels whereby said sprocket wheels can be driven in synchronism with said spool.

3. A filmstrip viewer as defined in claim 2 wherein said fitting is an axially mounted sprocket hub which is slotted to engage said spool.

4. A filmstrip viewer as defined in claim 3 wherein said sprocket hub is spring mounted on said shaft.

5. A filmstrip viewer as defined in claim 2 including a manual feed knob axially secured to said other end of said drive shaft and protruding from said enclosure to enable an operator to manually rotate said drive shaft and sprocket wheels geared thereto and thereby advance the filmstrip through said viewer prior to mounting to the tape recorder.

6. A filmstrip viewer as defined in claim 2 including a gear train gearing said drive shaft to said sprocket wheels, said gear train including a pair of meshing gears one of which has a tooth-free portion on its periphery, whereby said pair of gears disengage for a predetermined interval in each cycle to provide frame-by-frame sequencing of said sprocket wheels with a time delay for the incorporation of a synchronized sound presentation.

7. A filmstrip viewer as defined in claim 6 wherein said sprocket wheels are journalled to a common shaft and further including a manual fine adjustment knob axially secured to one end of said common shaft and protruding from said enclosure, whereby when said viewer is mounted to the tape recorder with said meshing gears disengaged, an operator can rotate said sprocket wheels separately from said drive shaft and gear train to finely adjust the positioning of a filmstrip frame with respect to said viewing means.

8. A filmstrip viewer as defined in claim 1 including battery powered illuminating means within said enclosure for illuminating the filmstrip as it passes through said viewer, and automatic switch means actuated when said viewer is mounted to the tape recorder to energize said illuminating means.

9. A filmstrip viewer as defined in claim 8 wherein said automatic switch means comprises a hollow hub extending from one surface of said enclosure and having an opening at the free end thereof, said hub also functioning as a support leg forming part of said support means, a reciprocable shaft mounted in said hub and extending at one end from said opening, means biasing said shaft through said opening, and a pair of open electrical contact members at least one of which is movable toward the other and lies in axial alignment with the other end of said shaft, whereby when said viewer is mounted to a tape recorder, the weight thereof acting against said one end of said shaft causes said shaft to move axially within said hub against said biasing means until said other end acts to move said contact members into electrical contact with each other.

10. A filmstrip viewer as defined in claim 8 wherein said illuminating means comprises an electric lamp mounted in a lamp socket, said lamp socket comprising a pedestal of electrical insulating material, a mounting plate of electrically conductive material secured to said pedestal and containing a lamp aperture the edges of which are cupped to act as a single screw thread, and a base contact plate of electrically conductive material mounted substantially parallel to and spaced from said mounting plate on said pedestal, said lamp being held in said lamp aperture with the lamp base in electrical contact with said base contact plate.

11. A filmstrip viewer adapted for removable mounting to a cassette tape recorder and being driven from a spool of a tape cassette loaded on the tape recorder to provide synchronized audio-visual presentations, comprising, in combination:
   A. an enclosure including means for guiding a filmstrip therethrough over a predetermined path,
   B. support means for removably supporting said enclosure on the tape recorder,
   C. viewing means in said enclosure permitting the viewing of the filmstrip as it passes through said viewer,
   D. illuminating means within said enclosure for illuminating the filmstrip as it passes through said viewer,
   E. advancing means for moving the filmstrip in a frame-by-frame sequence through said viewer comprising a pair of sprocket wheels journalled adjacent said path in position to engage the sprocket holes on the filmstrip, and
   F. driving means comprising,
      1. a drive shaft protruding at one end from said enclosure and carrying at said one end an axially mounted sprocket hub which is slotted to engage said spool, and
      2. a gear train gearing said drive shaft to said sprocket wheels to drive said sprocket wheels in synchronism with said spool,
         a. said gear train comprising a pair of meshing gears one of which has a tooth-free portion on its periphery, whereby said pair of gears disengage for a predetermined interval in each cycle to provide frame-by-frame sequencing of said sprocket wheels with a time delay for the incorporation of a synchronized sound presentation.

12. A film viewer adapted for removable mounting to a sound tape device and being driven synchronously with a spool-borne tape supply loaded on the tape device to provide synchronized audio-visual presentations, comprising, in combination:
  A. an enclosure including means for guiding a series of film elements sequentially therethrough over a predetermined path,
  B. support means for removably supporting said enclosure in an assigned location on the tape device,
  C. viewing means associated with said enclosure and permitting sequential viewing of the film elements as they pass through the enclosure,
  D. advancing means for moving the film elements in a frame-by-frame sequence through the enclosure, and
  E. driving means which
    1. when the enclosure is supported in said assigned location on the tape device, is interfittingly connected to the spool-driving system of the tape supply so as to be driven thereby, and
    2. is drivingly coupled to said advancing means to actuate the advancing means in timed relation to the motion of the spool.

13. A film viewer as defined in claim 12, in which
  A. said advancing means includes
    1. rotatable structure positively engaging the film elements to advance them as the structure rotates,
    2. a drive train coupling said driving means to said rotating structure for normally rotating the structure synchronously with the motion of the driving means, and
    3. means interposed in said drive train for disabling the drive train output for a predetermined interval in each driving cycle to provide frame-by-frame advancement of said film elements with spaced time delays for interpolation of synchronized sound presentations.

* * * * *